A. W. REDIN.
MECHANICAL MOVEMENT.
APPLICATION FILED MAY 31, 1907.

910,580.

Patented Jan. 26, 1909.

3 SHEETS—SHEET 3.

Witnesses
Milton Lenoir
George L. Chindahl

Inventor
Andrew W. Redin
By Luther L. Miller
Attorney.

UNITED STATES PATENT OFFICE.

ANDREW W. REDIN, OF ROCKFORD, ILLINOIS, ASSIGNOR TO WINLUND KNITTING COMPANY, OF ROCKFORD, ILLINOIS, A CORPORATION OF ILLINOIS.

MECHANICAL MOVEMENT.

No. 910,580.      Specification of Letters Patent.      Patented Jan. 26, 1909.

Application filed May 31, 1907. Serial No. 376,602.

*To all whom it may concern:*

Be it known that I, ANDREW W. REDIN, a citizen of the United States, residing at Rockford, in the county of Winnebago and State of Illinois, have invented certain new and useful Improvements in Mechanical Movements, of which the following is a specification.

The object of this invention is the production of an improved mechanism for alternately imparting rotary and oscillatory movements to a member.

I have herein shown my invention as employed to produce the rotary and oscillatory movements required in the operation of a circular hosiery knitting mechanism, although it will be understood that the invention is not limited to such use.

Figure 1:
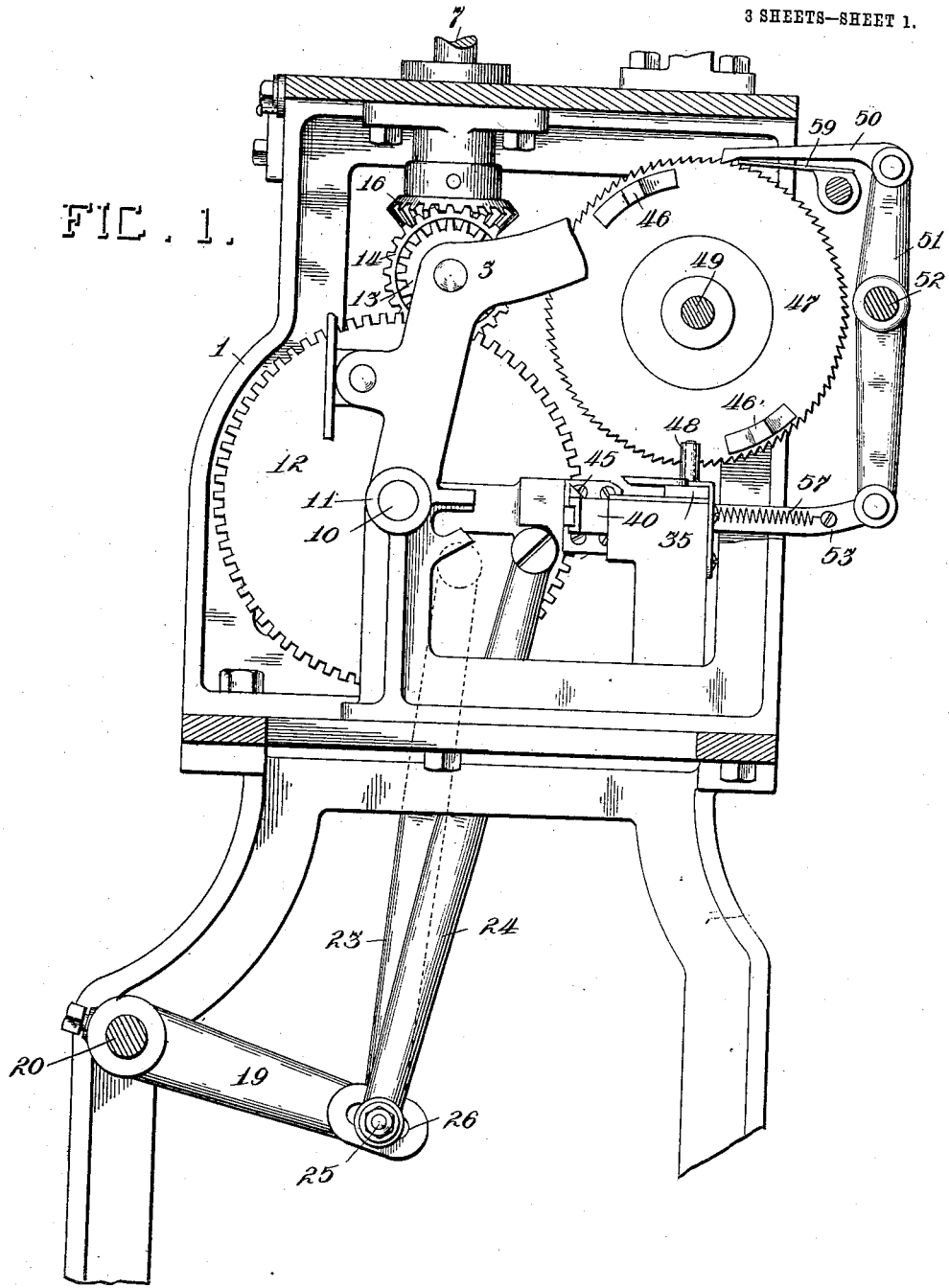
Figure 2:
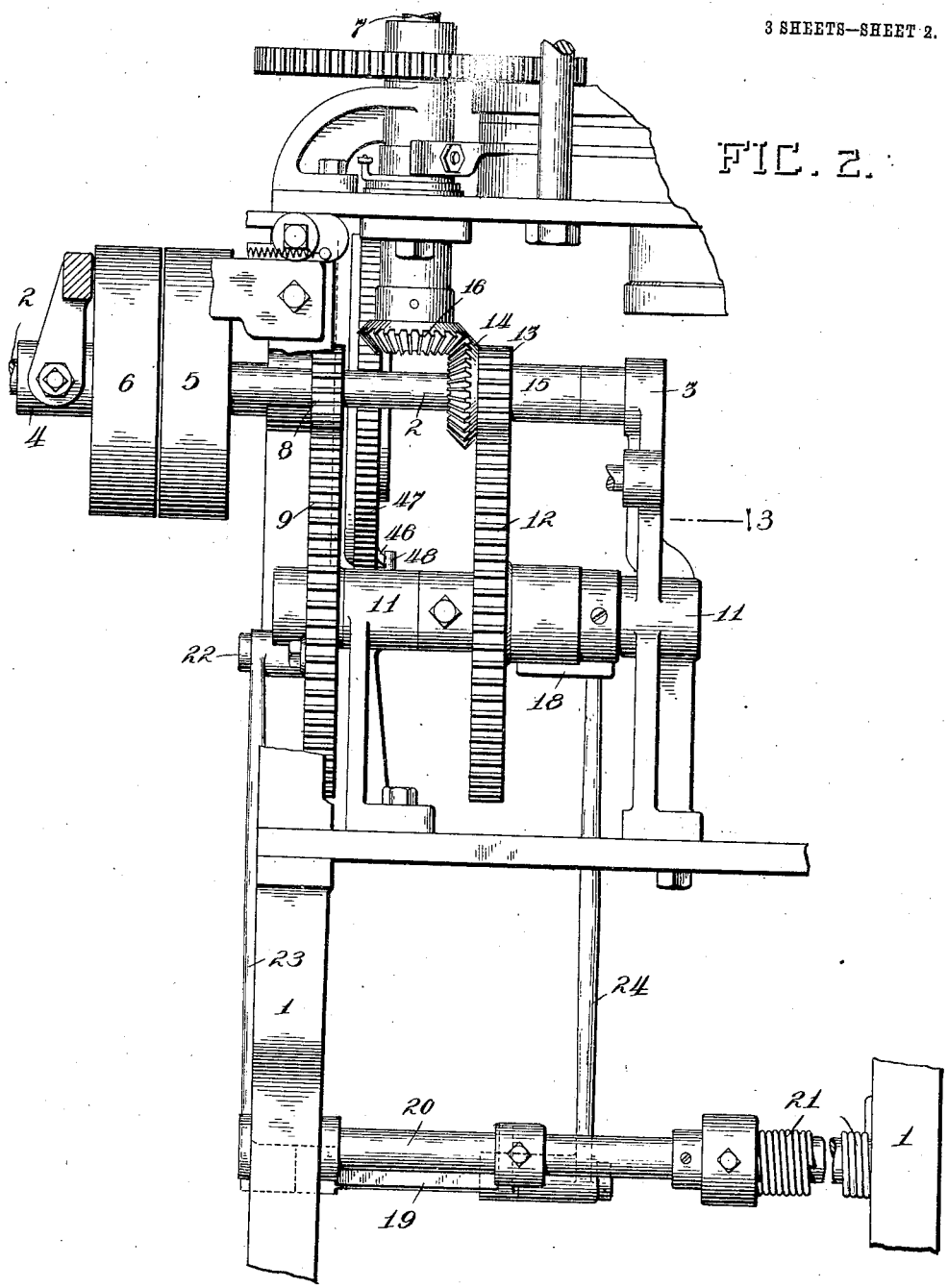
Figure 3:
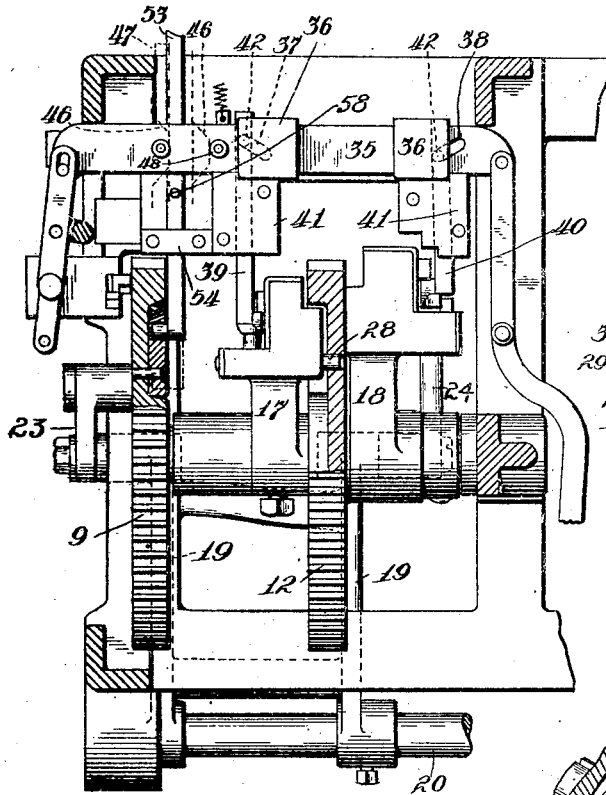
Figure 4:
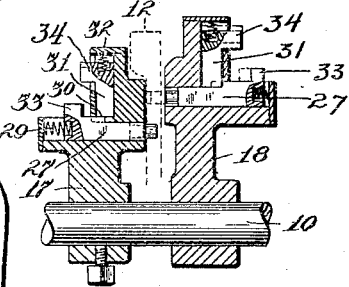
Figure 5:
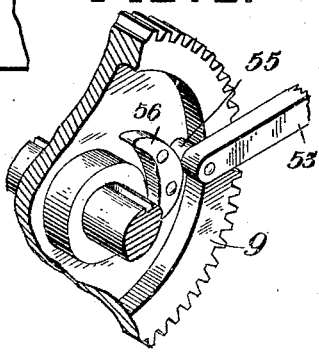
Figures 6, 7:
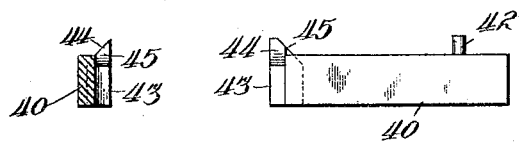

In the accompanying drawings, Figure 1 is an elevation of a portion of a circular knitting machine comprising my improved mechanical movement. Fig. 2 is a view taken from the left-hand side of Fig. 1. Fig. 3 is a horizontal sectional view taken on the plane of dotted line 3 of Fig. 2. Fig. 4 is a detail sectional view through the two crank arms and the driving shaft, with the parts in the position shown in Fig. 3. Fig. 5 is a detail perspective view of one of the cams. Fig. 6 is a detail view of a portion of the clutch-operating devices. Fig. 7 is a side view of the member shown in section in Fig. 6.

In the embodiment selected for illustration, 1 indicates a portion of the supporting framework of the knitting machine, and 2 the drive shaft thereof, said drive shaft being supported in bearings 3 and 4 in the framework. Upon the outer end of said shaft are mounted tight and loose pulleys 5 and 6, respectively. 7 is the vertical shaft through which motion is communicated to the knitting mechanism.

The continuous rotary movement of the drive shaft 2 is transmitted to the shaft 7 in the forms of rotary and oscillatory movements by mechanism comprising a gear wheel 8 fixed to the drive shaft 2 and meshing with a gear wheel 9 rigidly mounted upon a shaft 10 carried in bearings 11 in the supporting frame. Loosely mounted upon the shaft 10 is a gear wheel 12 meshing with a pinion 13 loosely mounted upon the drive shaft 2 and arranged to drive a bevel pinion 14. In this instance, the pinion 13 is rigidly mounted upon the hub 15 of the bevel pinion 14. The bevel pinion 14 is in mesh with a bevel pinion 16 rigidly mounted upon the lower end of the vertical shaft 7. Fixed to the shaft 10 at one side of the gear wheel 12 is a clutch arm 17 adapted by means to be hereinafter described to engage said gear wheel and continuously rotate it in one direction. At the opposite side of said gear wheel is a clutch arm 18 also adapted to engage said gear wheel, said last mentioned clutch arm being given a continuous oscillatory movement by means to be presently described. The clutch arms 17 and 18 are alternately connected with the gear wheel 12 in order at certain times to rotate said gear wheel continuously in one direction and at other times to give said gear wheel an oscillatory movement.

In the present embodiment the clutch arm 18 is driven from the gear wheel 9 by means comprising an arm 19 rigidly fixed to a rock shaft 20 mounted in the machine frame. Preferably the weight of the arm 19 and its connections is counterbalanced by a torsion spring 21 connected at one end with the shaft 20 and at its other end with the frame 1. The outer end of the arm 19 is connected with a wrist pin 22 upon one face of the gear wheel 9 by means of the connecting rod 23 and with the crank arm 18 by means of the connecting rod 23. The arc of movement of the crank arm 18 is preferably made adjustable by any suitable means, as, for example, by adjustably connecting the arm 19 and the connecting rod 24, which may be done by slidably mounting the pivot pin 25 in an elongated opening 26 in the outer end of the arm.

The means carried by each of the clutch arms 17 and 18 for connecting them with the gear wheel 12 being identical, a description of one will suffice to impart an understanding of both. Said means consists, in this instance, of a clutch pin 27 slidably mounted in the outer end of the clutch arm to move transversely thereof. One end of said pin is adapted to enter an opening 28 in the gear wheel 12, and between the other end of said pin and a fixed part of the clutch arm is a coiled spring 29 tending to move the clutch pin into engagement with said gear wheel. At a point between its ends a locking shoulder 30 is formed upon the clutch pin and a locking plunger 31 is adapted to lie behind said shoulder for locking the pin out of engagement with the gear wheel 12. A spring 32 tends to move the locking plunger 31 into locking engagement with the clutch pin 27. Lugs 33 and 34 upon the outer ends of the clutch pin 27 and the locking plunger 31, respectively, are provided for engagement by means to be next described for operating said clutch pin and locking plunger.

The means for alternately placing the clutch pins 27 in engagement with the gear wheel 12 comprises, in this instance, a bar 35 slidable in bearings 36, in which bar are formed two oppositely-inclined cam slots 37 and 38. Two pins 39 and 40 slidably mounted in bearing blocks 41 carry at their rear ends fixed studs 42 lying within the cam slots 37 and 38. At the opposite end of each of the pins 39 and 40 is formed a head 43 having inclined cam faces 44 and 45 adapted to engage the lugs 33 and 34 on the clutch pin 27 and the locking plunger 31, and withdraw said locking plunger from engagement with said clutch pin and said clutch pin from engagement with the gear wheel 12. It will thus be seen that when the bar 35 is moved to the left from the position shown in Fig. 3, the pin 39 will be moved into position to engage the clutch pin 27 carried by the clutch arm 18 and thereby disconnect said clutch arm from the gear wheel 12, and that the pin 40 will be moved into position to engage the locking plunger 31 carried by the clutch arm 18 and thereby connect said clutch arm with said gear wheel. A movement in the opposite direction (into the position shown in said figure) will disconnect the clutch arm 18 from the gear wheel 12 and connect the clutch arm 17 therewith.

Any suitable means may be employed for reciprocating the bar 35. I have herein shown said bar as reciprocated by means of cams 46 formed in and upon the peripheral portions of a ratchet wheel 47 and engaging roller studs 48 on the bar 35. The ratchet wheel 47 is carried by a shaft 49 mounted in the supporting frame. Said ratchet wheel is rotated through any suitable connections, as, for example, by means of a pawl 50 pivotally mounted upon one arm of a lever 51, said lever being carried by a shaft 52. The other arm of the lever 51 is pivotally connected with one end of a rod 53 slidably mounted in a bearing 54 in the framework 1. Upon the other end of said rod is a roller stud 55 adapted to be engaged by a cam 56 fixed upon the gear wheel 9. The rearward or restoring movement of the pawl 50 is herein shown as produced by a spring 57 fixed at one end to the rod 53 and at its other end to a stationary part of the machine frame. A stop pin 58 carried by the rod 53 limits the spring-actuated movement of said rod by striking against the bearing 54.

When the mechanical movement herein shown is employed in a circular knitting machine, means may be provided for suitably controlling the movements of the ratchet wheel 47 in order to effect a shifting of the clutch connections before described at the proper times to form the different parts of the stocking. In the present embodiment, said controlling means comprises a detent 59 adapted to be inserted below the point of the pawl 50 to prevent engagement of said pawl with the teeth of the ratchet wheel 47. When so inserted the pawl 50 slides idly upon the upper side of the detent. Suitable mechanism (not herein shown) is provided for moving the detent 59 into and out of operative relation with the pawl 50.

In operation, the gear wheel 9 and the clutch arm 17 are continuously rotated in one direction by the drive shaft 2. The clutch arm 18 is continuously oscillated by reason of its connection with the gear wheel 9 through the connecting rods 23 and 24 and the pivoted arm 19. Assuming the clutch pins 39 and 40 to be in the position shown in Fig. 3, the clutch arms 17 and 18 move past said pins without being affected thereby. When the bar 35 is moved longitudinally to the left, the clutch pins 39 and 40 are shifted in position so that upon the next movement of the arms 17 and 18 past said clutch pins, the pin 39 will disengage the clutch arm 17 from the driven wheel 12 and the clutch pin 40 will withdraw the locking plunger 31 carried by the clutch arm 18 and thus permit said clutch arm 18 to engage the driven wheel 12. The exchange of connections just described takes place as the clutch arms 17 and 18 swing downward side by side.

It is evident that various changes may be made in the embodiment herein shown without departing from the spirit and scope of my invention, therefore no undue limitation should be understood from the foregoing detailed description.

I claim as my invention:

1. The combination of a rotatory shaft; a wheel fixed on said shaft and provided with a crank pin and a cam; a driven member loose on said shaft; a clutch arm fixed on said shaft; a clutch arm loosely mounted on said shaft; a pivoted arm; a connecting rod joining said pivoted arm with said crank pin; a connecting rod joining said pivoted arm with said loosely-mounted clutch arm; means for engaging either of said clutch arms with said driven member; and means actuated by said cam for operating said engaging means.

2. In a clutch mechanism, in combination, a driven member; two clutch members adapted to engage said driven member; means for moving said clutch members; a slidable pin for each of said clutch members for operating it; a slidable bar having cam slots therein; studs on said pins lying within said cam slots; and means for moving said bar.

3. The combination of two pivoted arms;

means for moving said arms; a driven member located between said arms; a clutch mechanism carried by each of said arms; and means for synchronously operating said clutch mechanisms to throw one out of clutch with said driven member and the other into clutch with said member.

4. The combination of two pivoted arms; means for moving said arms; a driven member located between said arms; a clutch mechanism carried by each of said arms; two clutch-operating pins each for operating one of said clutch mechanisms; and means for synchronously moving said clutch-operating pins to throw one of said clutch mechanisms out of clutch with said driven member and the other into clutch with said member.

5. The combination of two pivoted arms; means for moving said arms; a driven member located between said arms; a clutch mechanism carried by each of said arms; two reciprocatory clutch-operating pins each for operating one of said clutch mechanisms; and means for synchronously moving said clutch-operating pins in opposite directions.

6. The combination of a rotatory arm; an oscillatory arm; a clutch mechanism carried by each of said arms; a driven member; and means for synchronously operating said clutch mechanisms to throw one out of clutch with said driven member and the other into clutch with said member.

7. The combination of a rotatory arm; an oscillatory arm; a driven member located between said arms; a clutch mechanism carried by each of said arms; two reciprocatory clutch-operating pins each adapted to operate one of said clutch mechanisms; and means for synchronously moving said clutch-operating pins in opposite directions.

8. The combination of a rotatory shaft; a wheel fixed on said shaft and provided with a cam; a driven member loose on said shaft; a clutch arm fixed on said shaft; a clutch arm loose on said shaft; a crank pin on said wheel; a pivoted arm connected with said crank pin and the second mentioned clutch arm for oscillating the latter; means for engaging either of said clutch arms with said driven member; and means actuated by said cam for operating said engaging means.

ANDREW W. REDIN.

Witnesses:
C. PAUL PARKER,
GEORGE L. CHINDAHL.